United States Patent
Groetsch et al.

(10) Patent No.: US 8,562,142 B2
(45) Date of Patent: Oct. 22, 2013

(54) PROJECTOR FOR MICRO PROJECTION SURFACES AND USE OF A MULTICOLOUR LED IN A PROJECTOR

(75) Inventors: Stefan Groetsch, Lengfeld-Bad Abbach (DE); Ewald Karl Michael Guenther, Regenstauf (DE); Alexander Wilm, Regensburg (DE); Siegfried Herrmann, Neukirchen (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 244 days.

(21) Appl. No.: 12/922,640

(22) PCT Filed: May 4, 2009

(86) PCT No.: PCT/DE2009/000636
§ 371 (c)(1),
(2), (4) Date: Dec. 8, 2010

(87) PCT Pub. No.: WO2009/143800
PCT Pub. Date: Dec. 3, 2009

(65) Prior Publication Data
US 2011/0085144 A1    Apr. 14, 2011

(30) Foreign Application Priority Data
May 26, 2008  (DE) .......................... 10 2008 025 160

(51) Int. Cl.
*G03B 21/28*   (2006.01)
(52) U.S. Cl.
USPC ............................. 353/39; 348/743; 353/31

(58) Field of Classification Search
USPC ............ 353/31, 39, 33, 34, 37; 349/5, 7, 8, 9; 348/742, 743, 771
See application file for complete search history.

(56) References Cited

U.S. PATENT DOCUMENTS

| | | | |
|---|---|---|---|
| 5,721,160 A | 2/1998 | Forrest et al. | |
| 5,739,552 A | 4/1998 | Kimura et al. | |
| 6,030,700 A * | 2/2000 | Forrest et al. | 428/336 |
| 7,796,672 B2 * | 9/2010 | Komatsu et al. | 372/99 |
| 8,243,770 B2 * | 8/2012 | El-Ghoroury et al. | 372/50.121 |
| 8,251,520 B2 * | 8/2012 | Erchak et al. | 353/94 |
| 2002/0030197 A1 | 3/2002 | Sugawara et al. | |
| 2003/0063462 A1 | 4/2003 | Shimizu et al. | |
| 2004/0207818 A1 | 10/2004 | Stahl | |
| 2004/0207823 A1 | 10/2004 | Alasaarela et al. | |
| 2006/0027820 A1 | 2/2006 | Cao | |

(Continued)

FOREIGN PATENT DOCUMENTS

| | | |
|---|---|---|
| CN | 1574659 | 2/2005 |
| DE | 10 2008 013 030 | 6/2009 |

(Continued)

OTHER PUBLICATIONS

M.H. Keuper et al., "Ultra-Compact LED based Image Projector for Portable Applications", 2003 Digest of Technical Papers, pp. 713-715, May 20, 2003, XP002551444.

(Continued)

*Primary Examiner* — William C Dowling
(74) *Attorney, Agent, or Firm* — Cozen O'Connor

(57) ABSTRACT

A multicolour LED, in which layers for generating light of different colors are arranged one above the other, is used as the light source in a projector.

11 Claims, 1 Drawing Sheet

(56) References Cited

U.S. PATENT DOCUMENTS

| | | | |
|---|---|---|---|
| 2006/0187419 A1* | 8/2006 | Yavid | 353/43 |
| 2006/0255343 A1 | 11/2006 | Ogihara et al. | |
| 2006/0267858 A1 | 11/2006 | Yun et al. | |
| 2006/0270075 A1 | 11/2006 | Leem | |
| 2007/0165186 A1 | 7/2007 | Copner et al. | |
| 2009/0015797 A1* | 1/2009 | Hatanaka et al. | 353/31 |
| 2011/0176116 A1* | 7/2011 | Grotsch et al. | 353/31 |

FOREIGN PATENT DOCUMENTS

| | | |
|---|---|---|
| DE | 10 2008 014 094 | 9/2009 |
| GB | 2 414 127 | 11/2005 |
| JP | 08-213657 | 8/1996 |
| JP | 2000-194275 | 7/2000 |
| JP | 2001-257379 | 9/2001 |
| JP | 2003-045206 | 2/2003 |
| JP | 2004-327719 | 11/2004 |
| JP | 2006-319099 | 11/2006 |
| WO | WO 2007/040322 | 4/2007 |
| WO | WO 2008/040300 | 4/2008 |

OTHER PUBLICATIONS

Examination Report dated Jun. 21, 2011.

* cited by examiner

PROJECTOR FOR MICRO PROJECTION SURFACES AND USE OF A MULTICOLOUR LED IN A PROJECTOR

RELATED APPLICATIONS

This is a U.S. national stage of application No. PCT/DE2009/000636, filed on May 4, 2009.

This application claims the priority of German application no. 10 2008 025 160.7 filed May 26, 2008, the entire content of which is hereby incorporated by reference.

FIELD OF THE INVENTION

The present invention relates to a compact configuration of projectors, which may be used in particular for mobile telephones, and to the use intended therefor of a multicolour LED.

SUMMARY OF THE INVENTION

One object of the present invention is to provide a particularly compact projector, which exhibits maximum efficiency with a micro image surface.

In projection systems for small image surfaces, LEDs emitting in different colours may be used, these being arranged next to one another and their light being directed onto an image generator by way of suitable optical devices. The image generator is operated by means of an electronic driving device and generates the image to be projected in each case on a screen. The colours red, green and blue conventionally used for colour composition may be produced in the image generator by elements arranged next to one another. If only a relatively small surface can be used because of the intended etendue of the image generator, losses arise, which have a negative effect on the efficiency of the projector. In particular for small projectors, which are for example intended for mobile telephone operation, high efficiency combined with a particularly small image surface is important. The above-described problem may in principle be eliminated by using three individual light sources, for example LEDs, and superimposing these light sources with the assistance of dichroic filters. In this way, an efficient optical system can be constructed. However, a disadvantage in this respect is the space required for the two or three dichroic filters which are necessary and the associated collimating lenses. It is therefore also impossible with this method to build a very compact projector suitable for incorporation into a mobile telephone.

According to at least one embodiment of the projector, the projector comprises a light source and an image generator, wherein the light source is a multicolour LED, in which layers for generating light of different colours are arranged one above the other. In particular it is then possible for the light source to be a single multicolour LED, i.e. the projector in this case comprises a single multicolour LED as light source. The projector may then be free of optical elements, i.e. the projector is then in particular free of lenses and dichroic mirrors or filters.

According to at least one embodiment of the projector, at least one of the layers is formed by an inorganic light-emitting diode, all the layers then, for example, being formed in each case by an inorganic light-emitting diode.

According to at least one embodiment of the projector, at least one of the layers is formed by an organic light-emitting diode.

According to at least one embodiment of the projector, the multicolour LED is an RGB LED, in which layers for generating red, green and blue light are arranged one above the other. It is in particular possible in this case for the layers not to be deposited epitaxially on one another. The layers may be individual light-emitting diodes, from which a growth substrate may in each case be removed. The individual light-emitting diodes may then for example in each case display a thickness of at most 20 µm, preferably of at most 10 µm. It is also possible, however, for the growth substrate to be removed only from the two upper light-emitting diodes (the light-emitting diodes emitting green and blue light), and for the growth substrate to remain on the bottom light-emitting diode (for example the light-emitting diode emitting red light).

For example, a bonding material may be arranged between each of the layers, such as for example a silicone and/or an epoxy resin, which bonds the layers together mechanically. In addition, a radiation-transmissive contact layer may in each case be arranged between two layers, which contact layer consists for example of TCO (Transparent Conductive Oxide) material and serves in electrical contacting of at least one of the layers.

According to at least one embodiment of the projector, the multicolour LED comprises a single light-emitting surface, through which light of the colours red, green and blue may pass when the projector is in operation. The light-emitting surface in this case preferably comprises an area of at most 4 $mm^2$, preferably at most 2.5 $mm^2$, for example at most 1 $mm^2$.

For the projector an LED is used in which light of different colours, preferably red, green and blue light, is emitted from the same surface. Semiconductor layers which are provided for the various colours are located one above the other in a layer stack of the LED. The light source provided thereby, hereinafter denoted as a stacked epi-LED, is combined with an image generator and a screen provided for projection. A combination of in particular red, green and blue light makes it possible to generate colour compositions necessary for the projection of images of any desired colours. As a result of the stacked arrangement of the light-emitting layers, the surface of the light source is no bigger than the surface of a light source provided for just one colour. A very compact arrangement is thus obtained, in which it is very largely possible to dispense with additional optical devices.

DETAILED DESCRIPTION OF THE DRAWINGS

Figure 1:
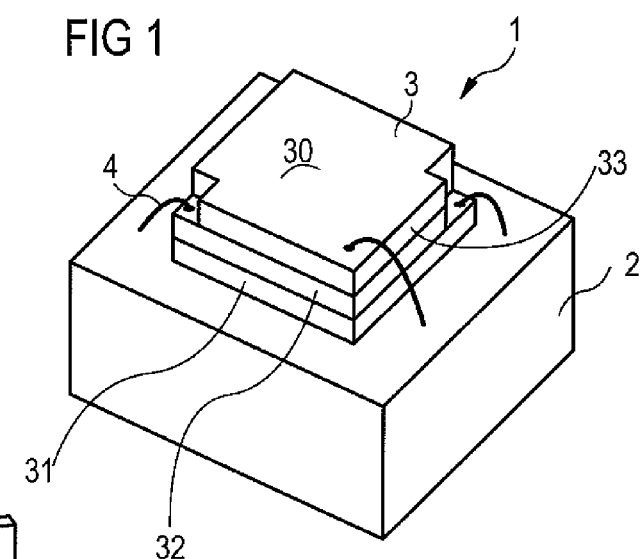
FIG. 1 shows an oblique plan view of a schematically illustrated stacked epi-LED.

Identical, similar or identically acting elements are provided with the same reference numerals in the Figures. The Figures and the size ratios of the elements illustrated in the Figures relative to one another are not to be regarded as being to scale. Rather, individual elements may be illustrated on an exaggeratedly large scale for greater ease of depiction and/or better comprehension.

FIG. 1 shows in an oblique plan view, as an example of the multicolour LED used, a stacked epi-LED 1, which may be produced by a per se known method by epitaxial growth of a stack of semiconductor layers on a semiconductor substrate and subsequent removal of the substrate. In the exemplary embodiment shown, the stacked epi-LED 1 takes the form of an RGB LED, such that it is suitable for emitting red, green and blue light. The layer stack 3 of semiconductor layers provided for producing light of the different colours is located on a submount 2.

In the schematic representation of FIG. 1, bonding wires 4 are shown which are provided for electrical connection of the semiconductor layers to a driving circuit integrated into the submount 2. The electrical connection may instead also be configured in another per se known manner. The LED used in the projector may in this respect be of in principle any desired configuration and in particular be conventionally contacted and electrically connected.

Figure 2:
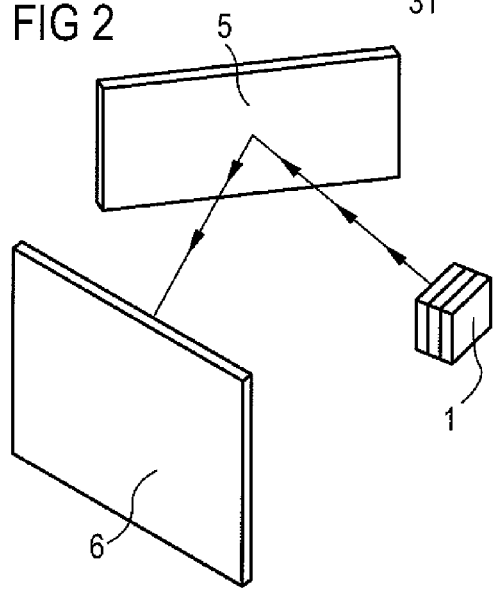
FIG. 2 shows an exemplary embodiment of a projection system with stacked epi-LED.

FIG. 2 shows one possible way of using the stacked epi-LED 1 in a projector system. The stacked epi-LED 1 is here oriented such that the light is directed onto an LCoS reflector (Liquid Crystal on Silicon), onto a DLP reflector (Digital Light Processing) or onto another reflector suitable as an image generator 5. The light is reflected by the image generator 5 onto a screen 6, on which the image to be generated is imaged. A DLP reflector is built up from a plurality of tiltable mirrors, which may be individually driven in a grid-like arrangement. The LED is operated such that the different colours are generated at very short intervals by sequential illumination of the layers provided for the various colours, such that overall an impression of mixed colours is obtained. This method is known per se and constitutes just one embodiment of the projector according to the invention.

Figure 3:
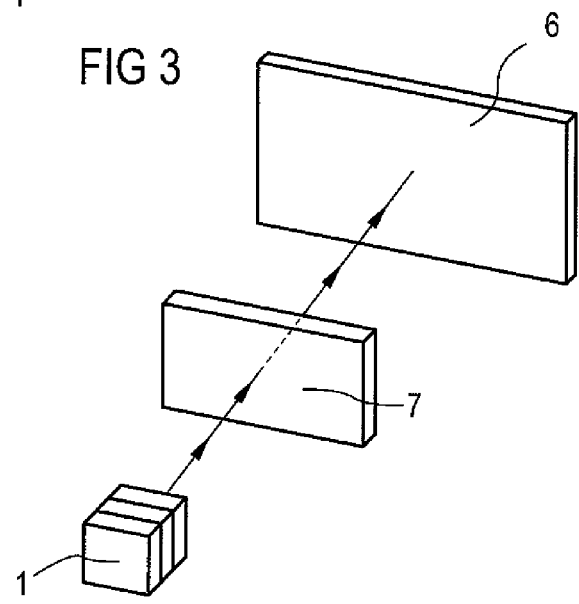
FIG. 3 shows a further exemplary embodiment of a projection system with stacked epi-LED.

FIG. 3 shows a further exemplary embodiment of a projection system, in which a stacked epi-LED 1 is used as light source. An LCD image generator is here provided as image generator 7, which to a greater or lesser extent filters the light passing through in the individual pixels, such that the colour structure corresponding to the image to be generated appears on the screen 6. The LCD image generator is driven in a per se known manner. The essential feature here too is that a very compact arrangement with a laterally tightly limited light emitting surface is achieved by using the stacked epi-LED.

An essential feature of the present invention is that the surfaces provided for light emission are arranged one above the other, such that the lateral dimensions of the light emitting surface may be kept small, although all the intended colours are available.

The description made with reference to exemplary embodiments does not restrict the invention to these embodiments. Rather, the invention encompasses any novel feature and any combination of features, including in particular any combination of features in the claims, even if this feature or this combination is not itself explicitly indicated in the claims or exemplary embodiments.

The invention claimed is:

1. A projector comprising:
   a light source; and
   an image generator;
   wherein the light source is a single multicolour LED which is an RGB LED, in which layers for generating red, green and blue light are arranged one above another in a layer stack;
   wherein the layers are at least partly not deposited epitaxially on one another, said layers being at least partly individual light emitting diodes from which a growth substrate is removed;
   wherein the single multicolor LED comprises a single light-emitting surface through which the red, green and blue light pass alternately when the projector is in operation; and
   wherein the single light-emitting surface comprises an area of at most 2.5 mm$^2$.

2. The projector according to claim 1, wherein the projector comprises a screen, on which an image is displayed when the projector is in operation.

3. The projector according to claim 1, wherein each of the layers is an individual light-emitting diode, which is free of a growth substrate.

4. The projector according to claim 1, wherein the image generator is an LCoS reflector.

5. The projector according to claim 1, wherein the image generator is a DLP reflector with tiltable mirrors.

6. The projector according to claim 1, wherein the image generator is an LCD image generator.

7. The projector according to claim 1, wherein the projector is adapted for installation in a mobile telephone.

8. The projector according to claim 1, further comprising:
   a bonding material arranged between each of the layers, the bonding material bonding the layers together mechanically.

9. The projector according to claim 1, wherein a respective radiation-transmissive contact layer is arranged between each respective layer.

10. The projector according to claim 9, wherein each respective radiation-transmissive contact layer is a Transparent Conductive Oxide (TCO).

11. The projector according to claim 9, wherein the light-emitting surface comprises an area of at most 1 mm$^2$.

* * * * *